James A. Woodbury's
Elastic Car Wheel.
117498  PATENTED JUL 25 1871
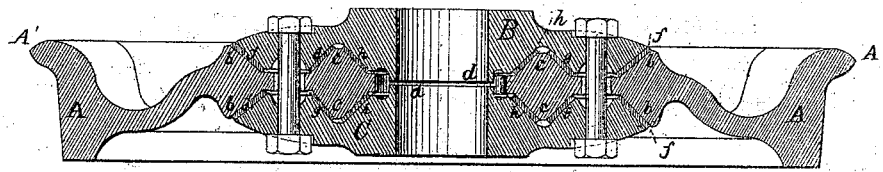
Fig. 2.
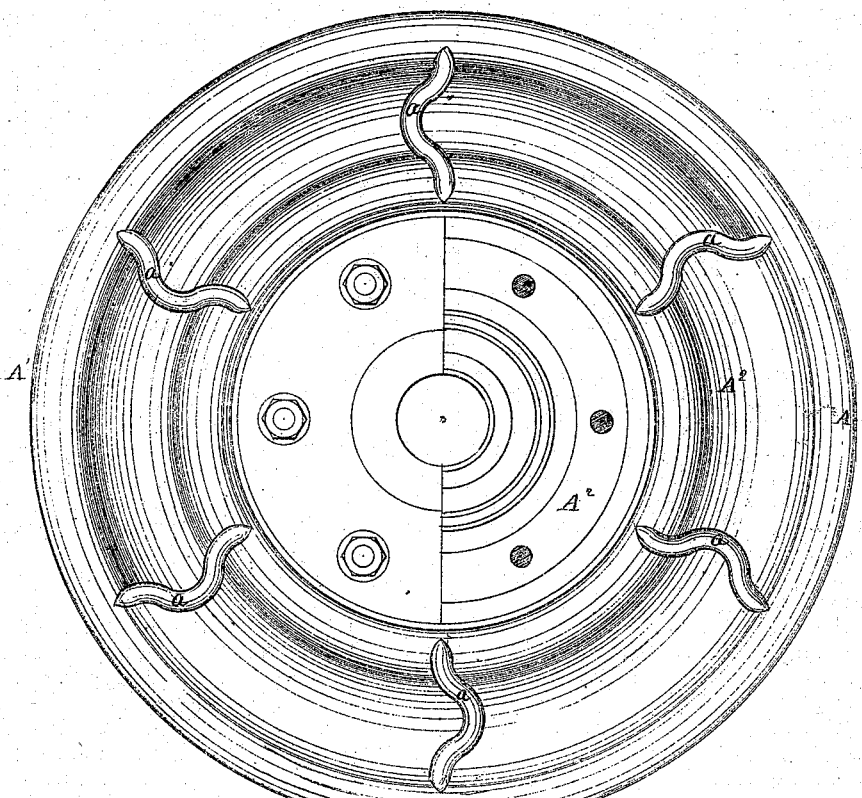
Fig. 1.
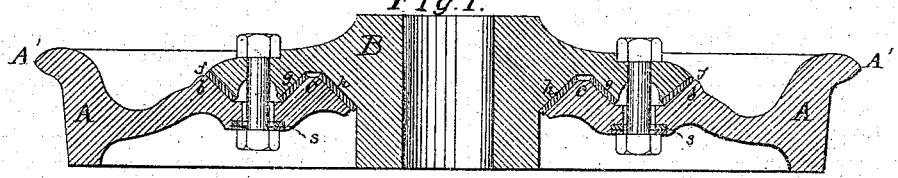
WITNESSES.    Fig. 3.    INVENTOR.
N. C. Lombard
W. C. Hibbard
James A. Woodbury

UNITED STATES PATENT OFFICE.

JAMES A. WOODBURY, OF BOSTON, MASSACHUSETTS.

IMPROVEMENT IN ELASTIC CAR-WHEELS.

Specification forming part of Letters Patent No. 117,498, dated July 25, 1871.

*To all whom it may concern:*

Be it known that I, JAMES A. WOODBURY, of Boston, in the county of Suffolk and State of Massachusetts, have invented certain new and useful Improvements in Elastic Car-Wheels, of which the following, taken in connection with the accompanying drawing, is a specification.

My invention relates to the formation of the several parts of the wheel and the manner of arranging the rubber or other elastic cushions; and it consists, first, in constructing the wheel in three parts, viz., a tire and two hub portions, the inner part of the tire being interposed between the two hub-disks and provided with two or more conical or beveled surfaces on either side thereof, said conical surfaces being beveled in opposite directions and at such an angle as will best resist both the vertical and lateral blows to which car-wheels are subject. It also consists in the formation of corresponding conical or beveled surfaces on the inner surfaces of both hub-disks, and securing the whole together by bolts passing through the three parts, but fitting only in the two hub-disks, rings of India rubber or other suitable elastic material having been first placed between the several conical surfaces, as will be more fully described.

Figure 1 is an elevation of the flange side of a car-wheel embodying my improvements, with part of one of the hub-disks cut away so as to show the rubber rings or cushions. Fig 2 is a section on line $x\ x$ on Fig. 1, and Fig. 3 is a modification of my improvement.

A is the tread or rim of the wheel, provided with a flange, $A^1$, and a web, $A^2$, the outer portion of which, next the tread, being made so that a cross-section cut through it in a radial line from the center of the wheel would present a waved line or corrugated surface, as seen in Fig. 2, and provided with strengthening-ribs $a\ a$, any suitable number of which may be used. The inner portion of the web next to the axle is a flat disk, having the ribs $b$ and $c$ cast on either side thereof, the inner sides of which are beveled toward the axle, and the outer side of $c$ is beveled in the opposite direction, the angle of said beveled surfaces being, according to circumstances, varied from twenty to forty-five degrees to the axis of the wheel. B and C are two disks, each provided with a hub upon either side thereof, and are bored out to fit the axle, and together form the hub of the wheel. These disks are of such a diameter as to lap over the straight or flat part of the web $A^2$ of the tire portion of the wheel, and have formed upon their inner sides inclined or conical surfaces corresponding to the inclined surfaces formed on the ribs $b$ and $c$ on the web $A^2$ of the tire portion of the wheel. The hubs $d$ formed on the inner sides of said disks nearly meet in the center of the thickness of the web $A^2$, the hole through the web being sufficiently large to allow the passage of said hubs without touching the web. Rings of vulcanized India rubber, $f\ g\ h$, or other elastic substances, are placed between the inclined surfaces, as shown in Fig. 2, and the whole is firmly secured together by the bolts $i\ i\ i$ arranged parallel to the axis of the wheel, as shown. The rings $f$ and $h$ are inclined in one direction and $g$ in an opposite direction—that is, the rings $f$ and $h$ on either side of the web have their outer edges inclined toward the tread of the wheel, and the ring $g$ has its outer edge inclined toward the axle in an obvious manner. In this way I am enabled to construct a car-wheel in parts, with an elastic substance interposed between in such a way as to intercept the lateral or vertical blow received by the tire and prevent its transmission to the axle of the car, using a cast-iron chilled tire. The holes through the web, through which the bolts pass, should be made much larger than the bolts, and also the inside diameter of the tire portion of the wheel should be greater than the diameter of the hubs $d$ on the inner sides of the hub-disks, so as to allow space for the movement of the tire upon the hub portion of the wheel without danger of the metal surfaces of the several parts coming in contact. It is obvious that a wheel may be constructed in two parts embodying the same general principles by dispensing with one of the hub-disks and making the hub on the other disk long enough to properly secure the wheel to the axle, as shown in Fig. 3. In this construction a rubber washer may be placed under the nut on the holding-bolts to prevent the vibrations of the tire from being transmitted to the hub portion of the wheel, as seen at $s$, Fig. 3.

Having thus fully described my invention, what I claim as new, and desire to secure by Letters Patent of the United States, is as follows:

A car-wheel, made in two or more parts, with two or more elastic cushions between each two of said parts, said cushions being arranged between inclined surfaces, as at $b$ and $c$, placed at opposite angles to the axis of the wheel, substantially as described.

Executed at Boston this 13th day of May, 1871.

JAMES A. WOODBURY.

Witnesses:
N. C. LOMBARD,
WM. C. HIBBARD.